(12) United States Patent
McGowen et al.

(10) Patent No.: US 10,160,375 B2
(45) Date of Patent: Dec. 25, 2018

(54) ILLUMINATED AIR CATCHER PASSAGE

(71) Applicants: Alexander B McGowen, Goodrich, MI (US); Michael H Nicholas, Troy, MI (US)

(72) Inventors: Alexander B McGowen, Goodrich, MI (US); Michael H Nicholas, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 65 days.

(21) Appl. No.: 15/141,107

(22) Filed: Apr. 28, 2016

(65) Prior Publication Data

US 2017/0313236 A1 Nov. 2, 2017

(51) Int. Cl.

| | |
|---|---|
| *B60Q 1/00* | (2006.01) |
| *F21S 41/24* | (2018.01) |
| *F21S 45/43* | (2018.01) |
| *F21S 41/141* | (2018.01) |
| *F21S 41/50* | (2018.01) |
| *B60Q 1/04* | (2006.01) |
| *F02M 35/10* | (2006.01) |

(Continued)

(52) U.S. Cl.
CPC ............ *B60Q 1/0017* (2013.01); *B60K 13/02* (2013.01); *B60Q 1/0011* (2013.01); *B60Q 1/0052* (2013.01); *B60Q 1/04* (2013.01); *B60Q 1/2607* (2013.01); *B60R 13/005* (2013.01); *F02M 35/10144* (2013.01); *F21S 41/141* (2018.01); *F21S 41/24* (2018.01); *F21S 41/50* (2018.01); *F21S 43/245* (2018.01); *F21S 43/50* (2018.01); *F21S 45/43* (2018.01); *B60Q 2400/20* (2013.01)

(58) Field of Classification Search
CPC ...... F21S 48/15; F21S 48/1241; F21S 48/115; F21S 48/325; B60Q 1/0017; B60Q 1/04; B60Q 1/0011; B60Q 2400/20; F02M 35/10144

See application file for complete search history.

(56) References Cited

U.S. PATENT DOCUMENTS

| | | |
|---|---|---|
| 4,120,024 A | 10/1978 | Aizenberg et al. |
| 7,841,756 B2 | 11/2010 | Kracker et al. |

(Continued)

FOREIGN PATENT DOCUMENTS

| | | |
|---|---|---|
| EP | 1749171 | 11/2011 |
| FR | 269055 A1 | 4/1994 |

(Continued)

OTHER PUBLICATIONS

2015 BMW i8 Tail Lamp photo.
2015 BMW X5 Headlamp photo.
2016 BMW 7-Series Headlamp photo.

(Continued)

*Primary Examiner* — Kevin Quarterman
(74) *Attorney, Agent, or Firm* — Ralph E. Smith

(57) ABSTRACT

An automotive vehicle includes a headlamp housing mounted to a body of the vehicle. An airflow opening extends through the headlamp housing. A light guide coupled to the housing forms a portion of an airflow passage extending from the airflow opening into an interior of the body of the vehicle. A surface of the light guide is etched with a design extending along a length of the airflow passage. An LED light generating unit is positioned adjacent an end of the light guide to pass light from the light generating unit through the light guide that illuminates the etched design.

6 Claims, 10 Drawing Sheets

(51) Int. Cl.
  *B60K 13/02*  (2006.01)
  *B60Q 1/26*  (2006.01)
  *B60R 13/00*  (2006.01)
  *F21S 43/245*  (2018.01)
  *F21S 43/50*  (2018.01)

(56) References Cited

U.S. PATENT DOCUMENTS

| | | |
|---|---|---|
| 9,221,331 B2 | 12/2015 | Vardis et al. |
| 2003/0026106 A1 | 2/2003 | Knaack et al. |
| 2011/0051452 A1* | 3/2011 | Shih ................... B60Q 1/0041 |
| | | 362/547 |
| 2013/0051046 A1 | 2/2013 | Yeh |
| 2015/0314675 A1* | 11/2015 | Vardis ................... B60K 13/02 |
| | | 180/68.3 |
| 2016/0161080 A1* | 6/2016 | Grosdidier .......... B60Q 1/0052 |
| | | 362/509 |
| 2016/0186957 A1* | 6/2016 | Lewerich ............. F21S 48/1145 |
| | | 362/509 |

FOREIGN PATENT DOCUMENTS

| | | |
|---|---|---|
| FR | 3008777 A1 | 1/2015 |
| GB | 2531545 A | 4/2016 |
| WO | 20150167779 A1 | 11/2015 |

OTHER PUBLICATIONS

International Search Report and Written Opinion dated Jul. 19, 2017 for International Application No. PCT/US2017/025969, International filing date Apr. 4, 2017.

* cited by examiner

ILLUMINATED AIR CATCHER PASSAGE

FIELD

The present disclosure relates to automotive headlamp assemblies including an air catcher passage.

BACKGROUND

U.S. Pat. No. 9,221,331 issued to Vardis et al, on Dec. 29, 2015 discloses headlamp assemblies incorporating an air induction or catcher passage that feeds air to an internal combustion engine, and is incorporated herein by reference. Vehicle lighting has become an important focus in providing the desired visual and emotional impact of a vehicle's aesthetic design.

Sometimes the desired aesthetic impact necessitates minimizing the fact that the headlamp assembly includes an air induction passage. In such cases, the air induction passage is made to resemble a headlamp unit as much as possible. Sometimes, however, the desired aesthetic impact is best achieved by emphasizing the presence of an air induction passage, such as for an aggressive high performance vehicle design.

SUMMARY

In an aspect of the present disclosure, a headlamp assembly for an automotive vehicle includes a headlamp housing mounted to a body of the vehicle. An airflow opening extends through the headlamp housing. A light guide coupled to the housing forms a portion of an airflow passage extending from the airflow opening into an interior of the body of the vehicle. A surface of the light guide is etched with a design extending along a length of the airflow passage. An LED light generating unit is positioned adjacent an end of the light guide to pass light from the light generating unit through the light guide that illuminates the etched design.

In another aspect of the present disclosure, the light guide and LED light generating unit comprise a sub-assembly mountable to the headlamp housing as an independent unit.

In another aspect of the present disclosure, a hardcoat layer covers an interior surface of the light guide, and the surface etched with the design is an opposite exterior surface of the light guide.

In another aspect of the present disclosure, the headlamp assembly includes a lens positioned between LED's of the light generating unit and the light guide, and the lens comprises a material to convert light emitted by the LED's to a selected color prior to entering the light guide.

In another aspect of the present disclosure, the light guide comprises a tubular member defining a length of the airflow passage and the headlight housing comprises a tubular boss surrounding the light guide.

In another aspect of the present disclosure, a conduit provides fluid communication between the airflow passage and an engine of the vehicle to provide air passing through the airflow passage to the engine.

DRAWINGS

The present invention will become more fully understood from the detailed description and the accompanying drawings.

DETAILED DESCRIPTION

Figure 1:
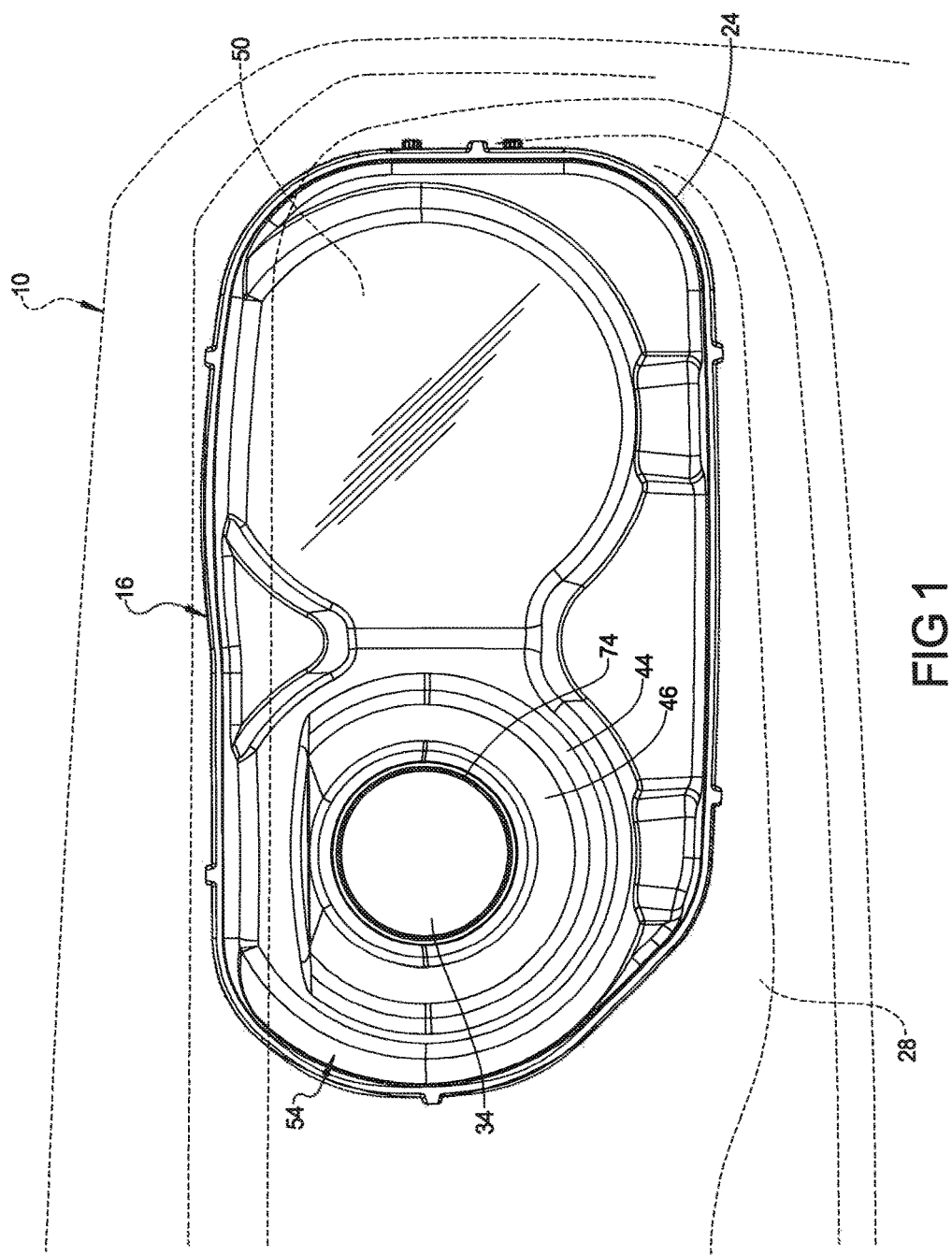
FIG. 1 is a front elevation view of a portion of a front end of a vehicle with one exemplary headlamp assembly in accordance with the present disclosure.

Further areas of applicability will become apparent from the description, claims and drawings, wherein like reference numerals refer to like features throughout the several views of the drawings. It should be understood that the detailed description, including disclosed embodiments and drawings referenced therein are merely exemplary in nature, intended for purposes of illustration only, and are not intended to limit the scope of the present disclosure.

FIGS. 1-8 illustrate one exemplary embodiment of a headlight assembly 16 for a vehicle 10, including an illuminated air catcher passage 34. The vehicle 10 includes an engine 12 and an air-induction system 14 that provides air to the engine 12 via an air cleaner 18. The headlamp assembly 16 includes an illuminated air catcher passage 34 of the air-induction system 14. Conduits 20, 22 extend between the illuminated air catcher passage 34 and the air cleaner 18, and between the air cleaner 18 and the engine 12, respectively.

The headlamp assembly 16 includes a housing 24 mounted to and at least partially received in a front end 28 (FIG. 1) of the vehicle 10. The headlight assembly 16 includes a light generating headlight unit 50 and headlight reflector 52 mounted on a frame 42, a light generating running light unit 44 and running light reflector 46, and a light generating turn signal unit 48 supported generally within a housing cavity 30 covered by a translucent cap 54. Any or all of the light generating units 50, 44, and 48 comprise LED units. Alternatively, any or all of the light generating units 50, 44, and 48 comprise any of an incandescent, halogen or HID (high-intensity discharge) bulb.

The cap 54 sealingly engages the housing 24 and encloses at least the light generating units 44 and 48 within the cavity 30 of the housing 24. The illustrated headlamp assembly 16 includes an air induction passage 34 extending through the sealed cavity 30. In this manner, the airflow opening 74 and the passage 34 cooperate to form a continuous passageway that extends entirely through the sealed first headlamp assembly 16. The air induction passage 34 passes through and includes airflow opening 74 through the translucent cap 54, an airflow opening 60 through the running light reflector 46, and an airflow opening 36 through a boss 32 disposed within the cavity 30 of the housing 24.

Figure 4:
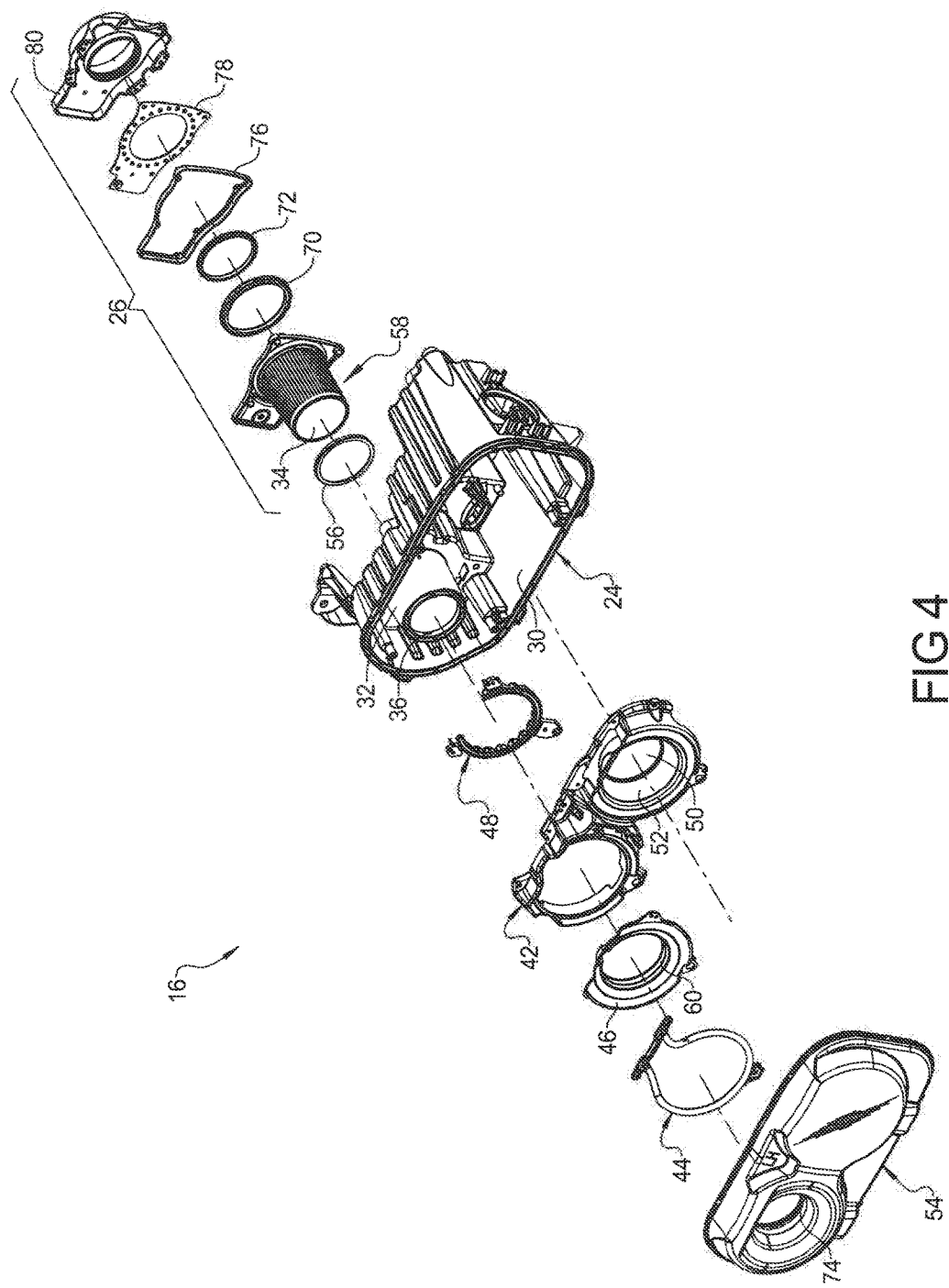
FIG. 4 is an exploded perspective view of the headlamp assembly of FIG. 1.
Figure 5:
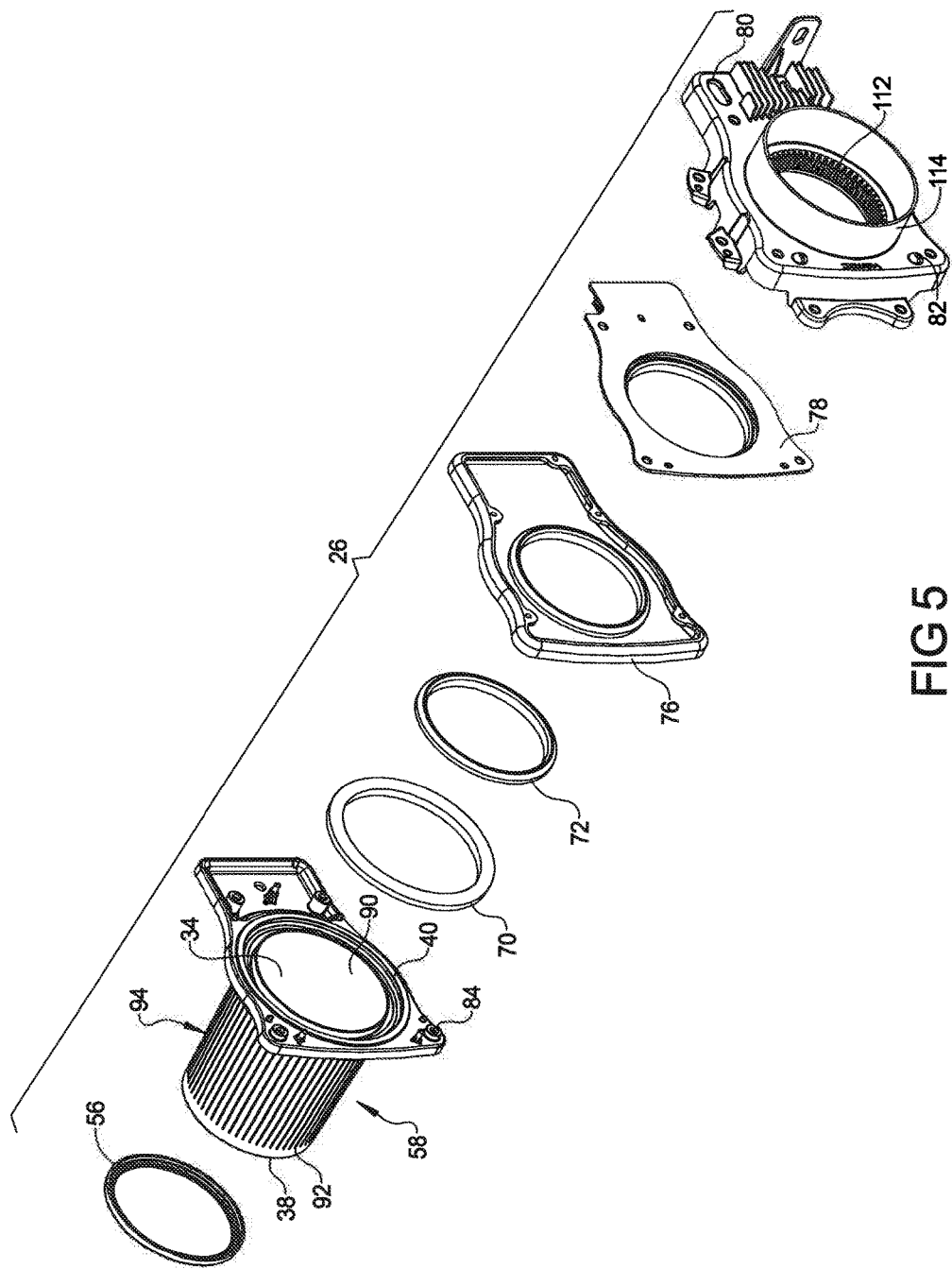
FIG. 5 is an enlarged exploded perspective view of the illuminated air catcher passage sub-assembly of the headlamp assembly of FIG. 1.
Figure 6:
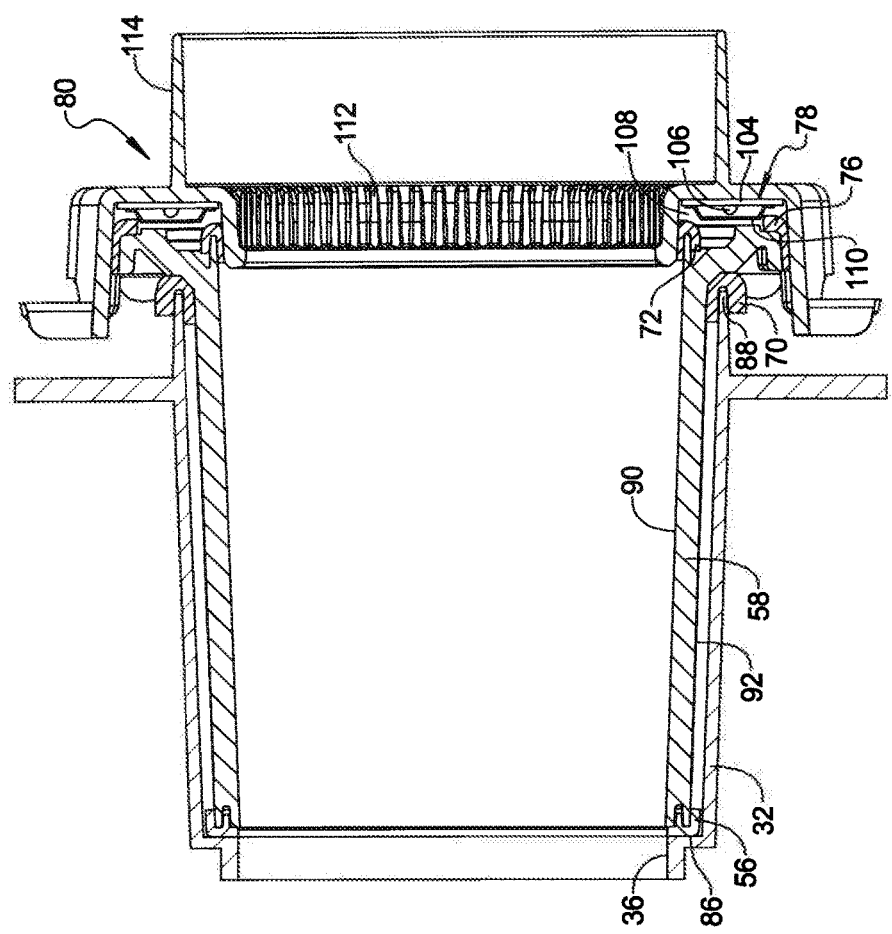
FIG. 6 is a cross-section view of the illuminated air catcher passage sub-assembly of FIG. 5.

Referring to FIGS. 4 and 5, an illuminated air catcher passage assembly 26 includes a front outer seal member 56, a light guide 58, rear outer seal member 70, front inner annular seal member 72, front inner plate seal member 76, light generating passage unit 78, and heat sink member 80. These components are assembled into an independent sub-assembly or unit 26 that is then coupled to the remainder of the headlight assembly 16. Threaded members 82 extend through openings 84 to hold the various components together as an independent sub-assembly 26. Alternatively, any or all of the components of the air catcher passage sub-assembly unit 26 are individually assembled into the headlamp assembly 16. In one such alternative, outer rear seal member 70 is individually mounted to the remainder of the headlamp assembly 16, separate from the remainder of the illuminated air catcher passage unit 26.

When assembled together, the front outer seal member 56 of the illuminated air catcher passage assembly 26 engages a flanged surface 86 at a front of the boss 32, and the rear outer seal member 70 is mounted on a rear 88 of boss 32. When sealed together, the boss 32 surrounds the light guide 58 to prevent unwanted ambient light from passing into or through the light guide 58. In an aspect, one or both of the boss 32 and the light guide 58 includes a generally conical shaped inner surface 90 that increases in diameter as the illuminated air catcher passage extends from its front end 38 toward its rear end 40.

The heat sink member 80 includes interiorly positioned fins 112 and an extending rear collar 114, around which the adjacent conduit 20 extends and to which the conduit 20 is coupled. Thus, heat generated by the LED's 106 is removed from the fins 112 and passes with the air flowing through the illuminated passage 36 through the conduits 20, 22 of the air-induction system 14 that provides air to the engine 12 via the air cleaner 18. In an aspect, the air passing through the air induction system 14 into the engine 12 is at least slightly pre-heated by the headlight assembly 16.

The air catcher passage assembly 26 defines an illuminated air catcher passage 36 between the air induction opening 74 and the adjacent conduit 20. In the illustrated example, light guide 58 is a generally cylindrical tubular member with a flanged light receiving end 40. The tubular wall between the inner and outer surfaces 90 and 92, respectively, of the light guide 58 defines the illuminated air catcher passage 36.

In an aspect, the inner surface 90 of the light guide 58 is smooth and comprises a clear hardcoat layer thereon to protect the surface 90 from potential damage or scratches from foreign objects aspirated into the passage 36. In a further aspect, the clear hardcoat layer on the inner surface 90 is a UV curable hardcoat for forward automobile lighting, such as that sold under the tradename UVT610 and supplied commercially by Red Spot Paint & Varnish Company, Inc. of Evansville, Ind.

The outer surface 92 of the light guide 58 wall has a design 94 etched therein. In an aspect, the etched design 94 comprises repeating elements 96 extending along substantially the entire length of the light guide 58. As illustrated, the repeating elements 96 are radially spaced axially extending linear elements. Alternatively, the repeating elements 96 are a series of radial or circumferential rings axially spaced to extend along substantially the entire length of the light guide 58.

Figure 7:
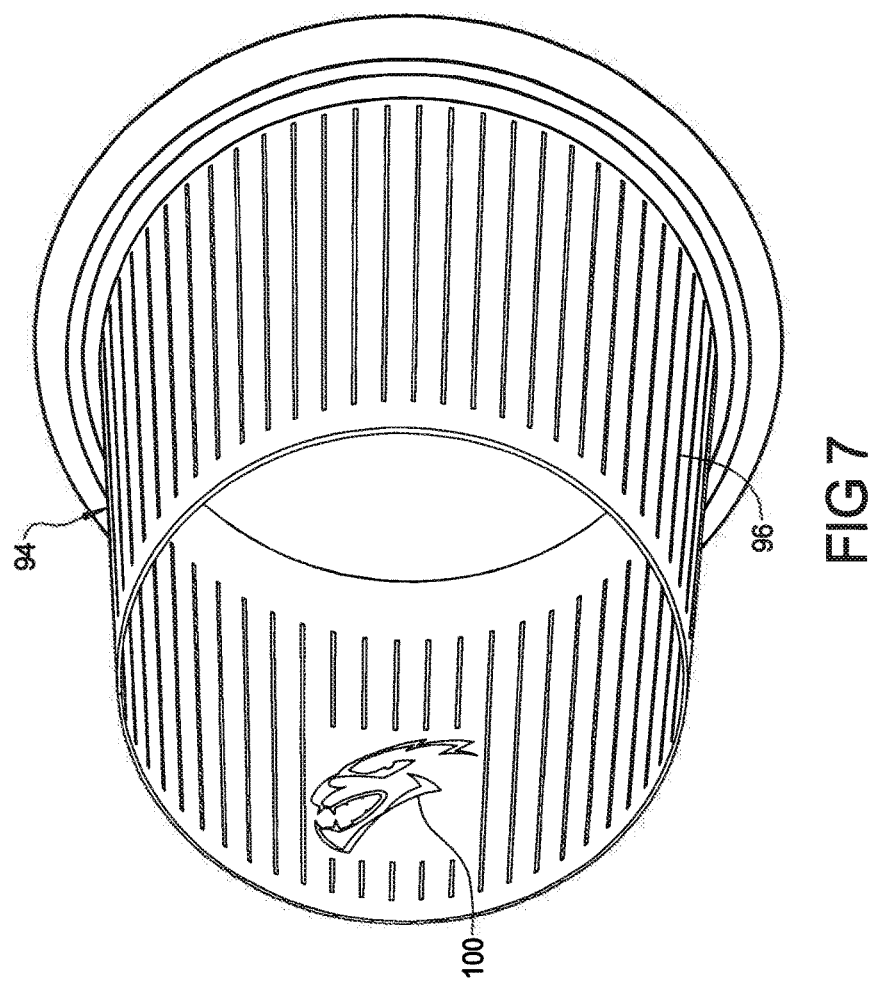
FIG. 7 is a perspective view of the light guide of the illuminated air catcher passage sub-assembly of FIG. 5.
Figure 8:
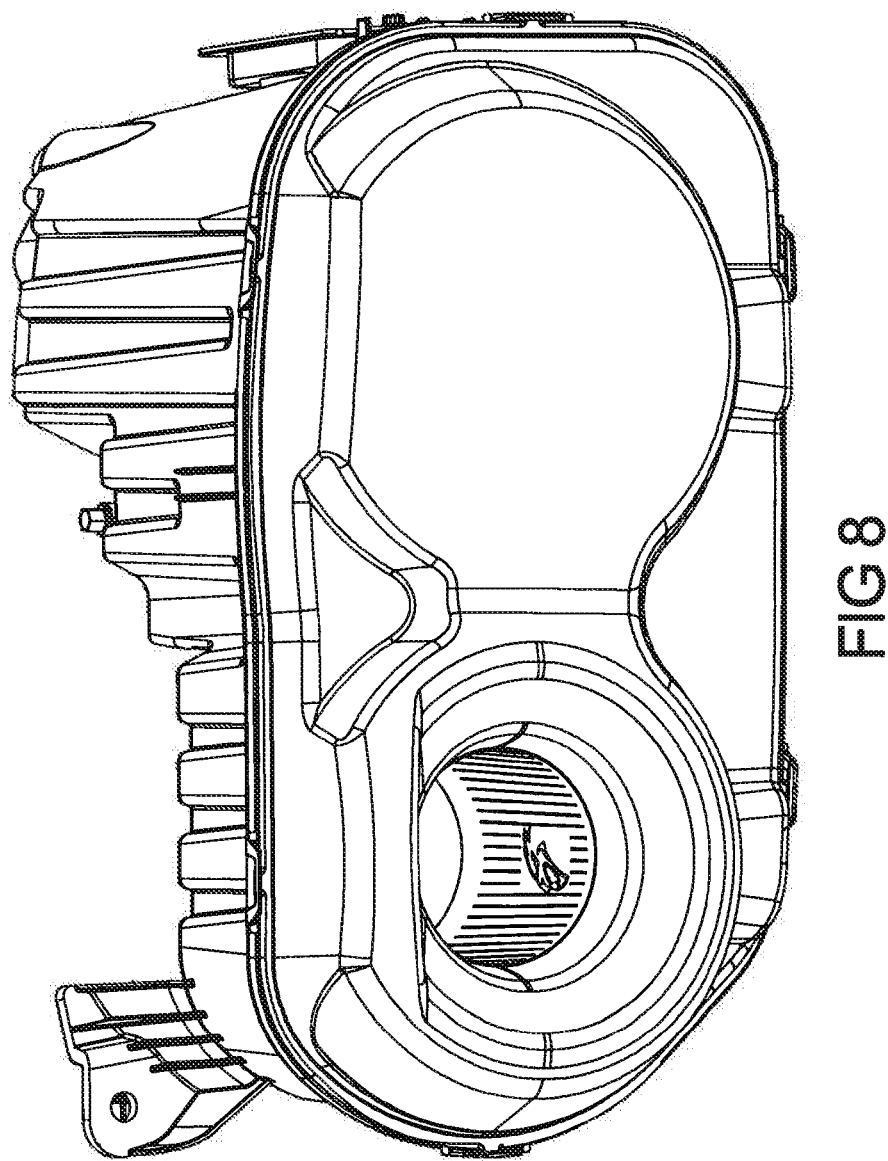
FIG. 8 is a perspective view of the exemplary headlamp assembly of FIG. 1 with a light guide etched with a pictorial graphic design.
Figure 9:
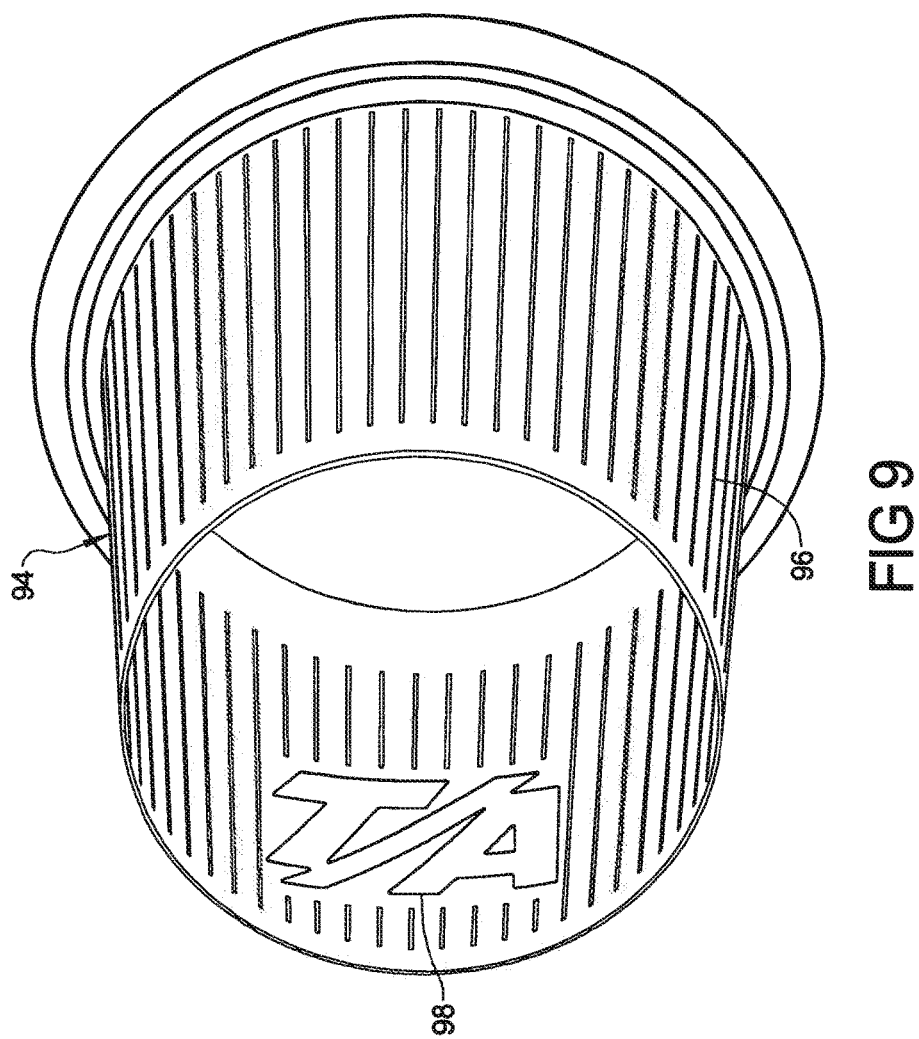
FIG. 9 is a perspective view of a light guide of the illuminated air catcher passage sub-assembly of FIG. 5 etched with an alternative textual graphic design.
Figure 10:
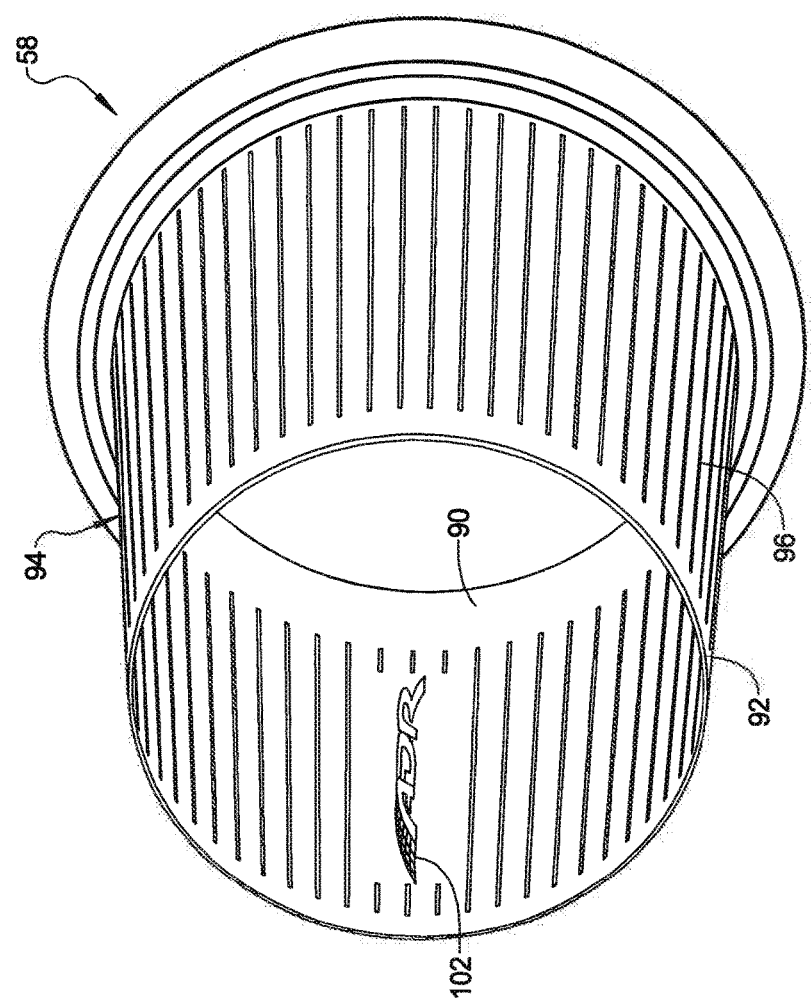
FIG. 10 is a perspective view of a light guide of the illuminated air catcher passage sub-assembly of FIG. 5 etched with an alternative combined textual and pictorial graphic design.

In an additional or alternative aspect, the design 94 comprises a pictorial logo 100 (FIGS. 7 and 8). In further additional or alternative aspects, the design comprises ordinary or stylized text such as a textual logo 98 (FIG. 9), and/or a textual and pictorial logo combination 102 (FIG. 10).

The air catcher light generating unit 78 comprises a printed circuit board 104 including an annular configuration of LED's 106 positioned within a sealed cavity 108 adjacent the rear end 40 of the light guide 58. In an aspect, a lens 110 is positioned between the LED's 106 and the light receiving or rear end 40 of the light guide 58. In a further aspect, the lens 110 is interchangeable or selectively coated with florescent or phosphorescent materials to convert the outputted LED light to a selective color prior to entering the light guide 58, without the need to use different LED's for different colored illuminated light passages 34.

The light guide 58 is made of a clear light guide material, such as a crystal lens grade polycarbonate material. The light from the LED's 106 enters the light guide 58 via the light receiving or rear end 40 thereof. The received LED light passes down the light guide 58 and is generally constrained by the light guide 58 between its inner surface 90 and its outer surface 92. The light, however, is scattered by the design 94 engraved or etched on the outer surface 92, causing the design to glow visibly through the inner surface 90 of the light guide as illustrated best in FIG. 10. Thus, it appears as if the inner surface 90 of the light guide 58 is glowing with the design 94, but the design positioned on the outer surface 92 where it is protected from damage by aspirated objects.

Figure 2:
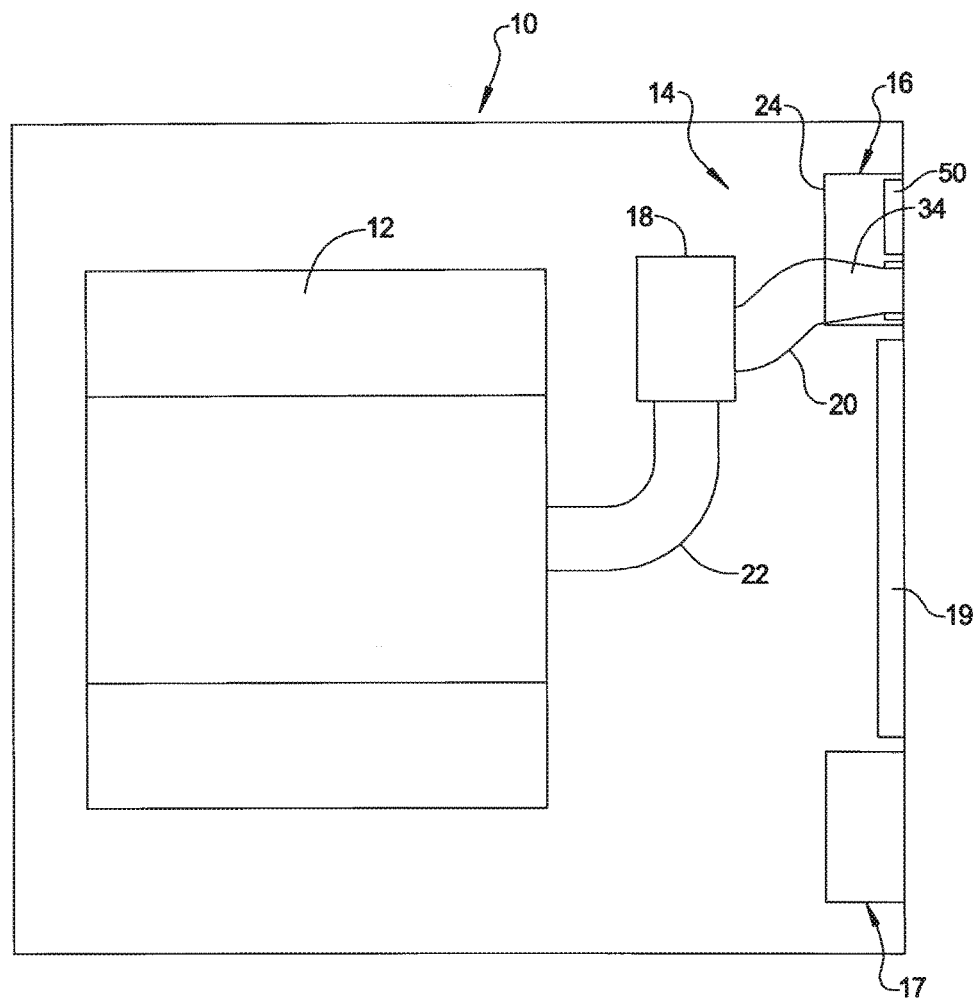
FIG. 2 is a simplified schematic representation of the vehicle with the headlamp assembly of FIG. 1.
Figure 3:
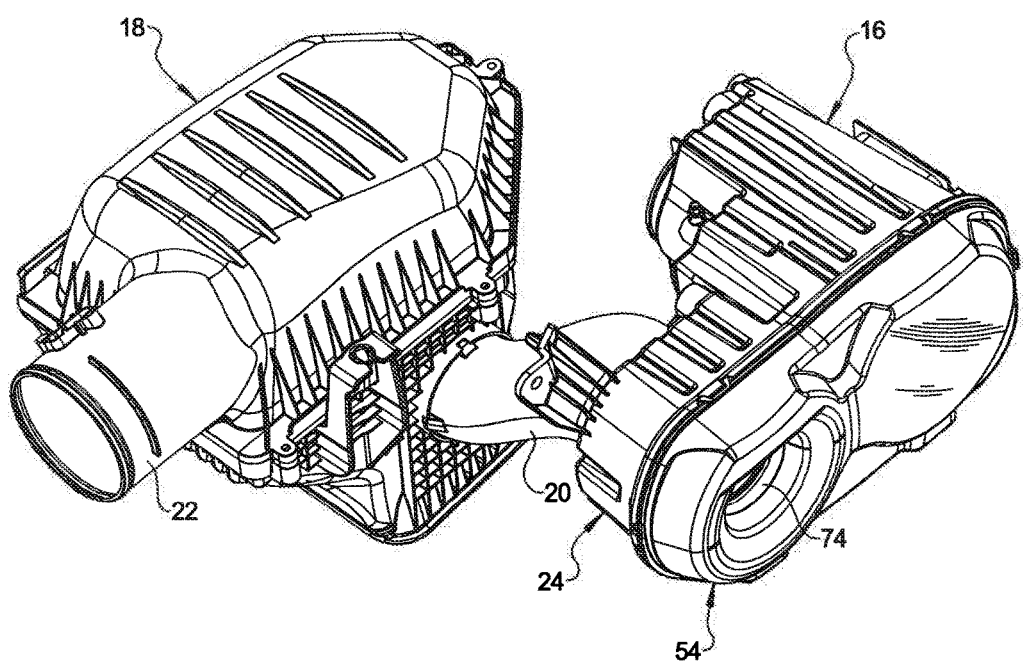
FIG. 3 is a perspective view of the headlamp assembly and air cleaner assembly of FIGS. 1 and 2.

As shown schematically in FIG. 2, the vehicle 10 may include both the driver's side headlamp assembly 16 and a passenger's side headlamp assembly 17, with a grille 19 disposed between the two headlamp assemblies 16, 17. In an aspect, the structure and function of the passenger's side headlamp assembly 17 is an identical mirror image assembly to the driver's side headlamp assembly 16. It will be appreciated, however, that both of the illuminated air catcher passage assemblies 26 of each of the headlamp assemblies 16, 17 are identical and interchangeable.

The positioning of the air-inlet openings 74 in the headlamp assemblies 16, 17 at the front end 28 of the vehicle 10 provides the additional benefit of being at a high air-pressure zone of the vehicle 10 while the vehicle 10 is moving forward. This causes a ram-air effect that forces a larger volume of air over a given time period through the air-induction system 14 and into the engine 12, which further improves engine performance.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A headlamp assembly for an automotive vehicle comprising:
   a headlamp housing mounted to a body of the vehicle and including an airflow opening extending through the headlamp housing;
   a light guide coupled to the housing forms a portion of an airflow passage extending from the airflow opening into an interior of the body of the vehicle;
   a visible surface of the light guide being etched with a design extending along a length of the airflow passage;

an LED light generating unit positioned adjacent an end of the light guide to pass light from the light generating unit through the light guide that differentially illuminates the etched design.

2. The headlamp assembly of claim 1, wherein the light guide and LED light generating unit comprise a sub-assembly mountable to the headlamp housing as an independent unit.

3. The headlamp assembly of claim 1, further comprising a hardcoat layer covering an interior surface of the light guide, and wherein the surface etched with the design is an opposite exterior surface of the light guide.

4. The headlamp assembly of claim 1, further comprising a lens positioned between LED's of the light generating unit and the light guide, wherein the lens comprises a material to convert light emitted by the LED's to a selected color prior to entering the light guide.

5. The headlamp assembly of claim 1, wherein the light guide comprises a tubular member defining a length of the airflow passage and the headlight housing comprises a tubular boss surrounding the light guide.

6. The headlamp assembly of claim 1, further comprising a conduit providing fluid communication between the airflow passage and an engine of the vehicle to provide air passing through the airflow passage to the engine.

* * * * *